United States Patent
Stanjek et al.

(10) Patent No.: US 11,421,068 B2
(45) Date of Patent: Aug. 23, 2022

(54) METHOD FOR PRODUCING ORGANYLOXYSILYL-TERMINATED POLYMERS

(71) Applicant: WACKER CHEMIE AG, Munich (DE)

(72) Inventors: Volker Stanjek, Ampfing (DE); Bernd-Josef Bachmeier, Haiming (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 440 days.

(21) Appl. No.: 16/471,741

(22) PCT Filed: Dec. 20, 2016

(86) PCT No.: PCT/EP2016/082032
§ 371 (c)(1),
(2) Date: Jun. 20, 2019

(87) PCT Pub. No.: WO2018/113937
PCT Pub. Date: Jun. 28, 2018

(65) Prior Publication Data
US 2019/0330404 A1  Oct. 31, 2019

(51) Int. Cl.
| | | |
|---|---|---|
| *C08G 18/10* | (2006.01) | |
| *C08G 18/22* | (2006.01) | |
| *C08G 18/24* | (2006.01) | |
| *C08G 18/28* | (2006.01) | |
| *C08G 18/48* | (2006.01) | |
| *C08G 18/71* | (2006.01) | |
| *C08G 18/76* | (2006.01) | |
| *C08G 77/26* | (2006.01) | |

(52) U.S. Cl.
CPC ........... *C08G 18/10* (2013.01); *C08G 18/222* (2013.01); *C08G 18/227* (2013.01); *C08G 18/246* (2013.01); *C08G 18/289* (2013.01); *C08G 18/4825* (2013.01); *C08G 18/718* (2013.01); *C08G 18/7671* (2013.01); *C08G 77/26* (2013.01)

(58) Field of Classification Search
CPC .... C08G 18/10; C08G 18/222; C08G 18/227; C08G 18/246; C08G 18/289; C08G 18/4825; C08G 18/718; C08G 18/7671; C08G 77/26
See application file for complete search history.

(56) References Cited

U.S. PATENT DOCUMENTS

| | | | |
|---|---|---|---|
| 3,562,182 A * | 2/1971 | Hsieh et al. ........... | C08G 65/12 502/153 |
| 8,101,704 B2 | 1/2012 | Baumann et al. | |
| 8,158,818 B2 | 4/2012 | Stanjek et al. | |
| 2005/0119436 A1 | 6/2005 | Ziche et al. | |
| 2010/0016537 A1 | 1/2010 | Bamann et al. | |
| 2010/0280209 A1 | 11/2010 | Braun et al. | |
| 2011/0028640 A1 | 2/2011 | Klein et al. | |
| 2012/0168080 A1 | 7/2012 | Choffat et al. | |
| 2014/0311674 A1 | 10/2014 | Stanjek et al. | |
| 2016/0160103 A1 | 6/2016 | Stanjek et al. | |

FOREIGN PATENT DOCUMENTS

| | | |
|---|---|---|
| CN | 101883804 A | 11/2010 |
| DE | 102007037641 A1 | 3/2008 |
| EP | 931800 B1 | 10/2004 |
| EP | 1535940 B1 | 6/2005 |
| EP | 2097426 B1 | 6/2010 |
| EP | 1896523 B1 | 10/2010 |
| EP | 2470599 B1 | 5/2013 |
| EP | 2636692 A1 | 9/2013 |
| EP | 1937697 B1 | 10/2013 |
| WO | 2009133061 A1 | 11/2009 |
| WO | 2009133062 A1 | 11/2009 |
| WO | 2011072056 A2 | 6/2011 |
| WO | 2013079330 A2 | 6/2013 |
| WO | 2015024773 A1 | 2/2015 |

* cited by examiner

*Primary Examiner* — Patrick D Niland
(74) *Attorney, Agent, or Firm* — Brooks Kushman P.C.

(57) ABSTRACT

Metal catalysts employed in the preparation of organyloxysilyl-functional, moisture curable polymers, are deactivated by cheating with specific chelating agents. Compositions containing the polymers exhibit improved storage stability.

10 Claims, No Drawings

METHOD FOR PRODUCING ORGANYLOXYSILYL-TERMINATED POLYMERS

CROSS REFERENCE TO RELATED APPLICATIONS

This application is the U.S. National Phase of PCT Appln. No. PCT/EP2016/082032 filed Dec. 20, 2016, the disclosure of which is incorporated in its entirety by reference herein.

FIELD OF THE INVENTION

The invention relates to a process for preparing organyloxysilyl-terminated polymers and also to polymer compositions comprising a metal chelate complex, and to the use thereof.

DESCRIPTION OF THE RELATED ART

Moisture-crosslinkable preparations based on silyl-functionalized polymers are known, and find use in particular as sealants, adhesives and/or as coatings. One particularly important use within these is represented by polymers having terminal or lateral alkoxysilyl groups, since during the crosslinking reaction these polymers only release alcohols which are noncorrosive and which in view of the small quantities are also toxicologically unobjectionable.

In the presence of atmospheric moisture, the alkoxysilyl-functionalized polymers are able to react with one another even at room temperature in a two-stage reaction consisting of hydrolysis and subsequent condensation, so leading to the curing of the material in question. Generally, however, it is necessary to accelerate these curing reactions by adding a catalyst. Typical catalysts in this context include metal compounds, especially Lewis-acid metal compounds.

The alkoxysilyl-functionalized polymers are prepared by known methods. One common process is the reaction of polymers possessing end groups having active hydrogen with isocyanatoalkyl-alkoxysilanes. The reaction is carried out generally in the presence of catalysts. EP-A 931 800 describes the preparation of alkoxysilyl-functional polyurethanes from hydroxy-functional polyurethane polymers and, for example, isocyanatopropyltrimethoxysilane, under anhydrous conditions and preferably under an inert gas atmosphere to prevent premature hydrolysis of the alkoxysilane groups. Catalysts used in this case are preferably tin-containing compounds such as dibutyltin dilaurate, tin octoate or tin acetate.

EP-A 1 535 940 describes a process for preparing silane-terminated polyethers by reacting long-chain, hydroxy-functional polyether polyols with isocyanatoalkyl-alkoxysilanes, the reaction taking place in the presence of catalysts consisting of compounds of bismuth and of zinc, such as bismuth neodecanoate or zinc 2-ethylhexanoate, for example.

Other catalysts for preparing silane-terminated polymers from hydroxy-functional polymers and isocyanatoalkyl-alkoxysilanes are described in WO 2009/133061 and also WO 2009/133062. Catalysts employed there are selected from the group consisting of compounds of potassium, of iron, of indium, of zinc, of bismuth, and of copper, as for example potassium neodecanoate, indium neooctoate, copper naphthenate or iron naphthenate.

Another process for preparing alkoxysilyl-functionalized polymers envisages sequential or else simultaneous reaction of three components. The first component is a hydroxy-functional polymer, typically a hydroxy-functional polyester or polyester. The second component consists of isocyanates having at least two isocyanate groups per molecule, and is used in excess relative to the first component. The third component, finally, is an aminoalkyl-alkoxysilane. With this process, the product is referred to as an alkoxysilyl-terminated polyurethane.

This preparation pathway has also been much described, as for example in EP-A 2 470 599 or else WO 2013/079330. Here as well, in particular, a metal-containing catalyst is often used for accelerating the reaction of the isocyanate groups of the aforementioned second component with the hydroxyl groups of the first component. For instance, the examples of EP-A 2 470 599 use dibutyltin dilaurate, while in WO 2013/079330 a bismuth-containing catalyst (Borchi® Kat 0244) is employed.

A drawback of all of these processes is the fact that the respective catalyst used remains in the end product. This may lead to a host of problems. For instance, the metal catalysts, which in the polymer preparation serve for accelerating formation of urethane from hydroxyl function and isocyanate function, are generally likewise capable of catalyzing the hydrolysis and condensation of the alkoxysilyl groups. This is true especially of all tin and organotin compounds, which are common curing catalysts for alkoxysilyl-terminated polymers. However, virtually all other metal-containing catalysts employed in the preparation of silyl-terminated polymers also possess the capacity, at least to a certain extent, to accelerate the curing reaction of these same polymers as well.

This leads to reduced stability of these polymers toward atmospheric moisture. Although the ready-formulated end product, i.e., the ready-to-use adhesive or sealant or the fully formulated coating, is of course required to have sufficient reactivity toward atmospheric moisture and hence an application-friendly cure rate, this reactivity toward atmospheric moisture is of course definitively unwanted in the polymer itself in its not yet fully formulated state. This reactivity, accordingly, not only makes the polymer more difficult to handle but also reduces its storage life, unless it is possible to rule out any contact with (atmospheric) moisture—that, however, is possible only with considerable and hence also cost-intensive effort.

Another problem may arise if the silyl-terminated polymers are prepared using catalysts containing comparatively noble metals, examples being indium, bismuth or copper catalysts. In this case, in the presence of compounds with a reducing effect, the metal catalyst may be reduced to form the elemental metal, which is then obtained usually in the form of a black colloidal solid and leads to severe discoloration.

These reducing substances may have been added unintentionally—for example, as an impurity in other components of an adhesive or sealant formulation—or else deliberately, as antioxidants for example. In any event, however, the result, the striking gray or even black coloration, is unwanted.

Lastly, the metal catalysts may also adversely affect the stability of other formulation constituents with which the silyl-terminated polymer is compounded during the production of the particular end product, i.e., the ultimately desired adhesive, sealant or coating material. Critical in this regard in particular are tin catalysts and also iron catalysts, which can, for example, cause cleavage of esters used as plasticizers.

At the same time, however, in the case of the preparation of the silyl-terminated polymers via a urethane reaction, it is not possible to do without the use of metal-containing catalysts either, since the reaction times would otherwise be too long and the corresponding preparation process would therefore be unprofitable. Removing the metal catalysts from the finished, silane-terminated prepolymer is likewise not feasible with commercially viable measures.

An object of the invention, therefore, was a commercially viable process for preparing silyl-terminated polymers wherein the product and also the formulations preparable from the product no longer have the drawbacks identified above.

SUMMARY OF THE INVENTION

A subject of the invention is a process for preparing organyloxysilyl-terminated polymers (A), characterized in that
in a first step at least one hydroxy-functional organic compound is reacted with at least one isocyanate-functional compound and also, optionally, with a silane containing organyloxy groups, in the presence of at least one metal-containing catalyst (B), and
in a second step the resulting reaction mixture is admixed with a chelating agent (C), which is selected from
(C1) crown ethers,
(C2) heterocycle-containing compounds whose heteroatom located in the cyclic moiety possesses a free electron pair, and which comprises at least one further heteroatom having a free electron pair, and
(C3) compounds containing at least two groups per molecule that are selected from carboxyl groups, carboxylate groups, sulfate groups, sulfonate groups, phosphate groups, phosphonate groups, cyanide groups, and cyanate groups.

A further subject of the invention are compositions comprising
(A) organyloxysilyl-terminated polymers, preparable by reaction of at least one hydroxy-functional organic compound with at least one isocyanate-functional compound and also, optionally, a silane containing organyloxy groups, in the presence of at least one metal-containing catalyst (B), and also
(U) at least one product of reaction of catalyst (B) and chelating agent (C).

DETAILED DESCRIPTION OF THE PREFERRED EMBODIMENTS

The organyloxysilyl-terminated polymers (A) prepared in accordance with the invention are preferably polymers of the formula

Y—[X—NR³—(CR¹₂)ᵦ—SiRₐ(OR²)₃₋ₐ]ₓ (I)

where
Y is an x-valent polymer radical,
R may be identical or different and is a monovalent, optionally substituted, SiC-bonded hydrocarbon radical,
R¹ may be identical or different and is hydrogen atom or a monovalent, optionally substituted hydrocarbon radical which may be attached via nitrogen, phosphorus, oxygen, sulfur, or carbonyl group to the carbon atom,
R² may be identical or different and is hydrogen atom or a monovalent, optionally substituted hydrocarbon radical,
R³ may be identical or different and is hydrogen atom, a monovalent, optionally substituted hydrocarbon radical, or a group —CH(COOR⁴)—CH₂—COOR⁴,
R⁴ may be identical or different and is a monovalent, optionally substituted hydrocarbon radical, X is a —NH—C(=O)— or —O—C(=O)— group,
x is an integer from 1 to 10, preferably 1, 2 or 3, more preferably 1 or 2,
a may be identical or different and is 0, 1 or 2, preferably 0 or 1, and
b may be identical or different and is an integer from 1 to 10, preferably 1, 3 or 4, more preferably 1 or 3, more particularly 1.

The invention is based on the surprising discovery that complexing agent (C) is capable of deactivating (B) the metal-containing catalyst and hence of reducing or even completely eliminating the negative effects described for the active catalyst in the completed alkoxysilyl-terminated polymer.

Hence it has surprisingly been found that the organyloxy-group-terminated polymers (A) prepared by the process of the invention exhibit a significantly improved stability toward atmospheric moisture in comparison to polymers not prepared in accordance with the invention, and that this considerably facilitates their handling in the course of further processing.

Also surprising is the fact that it is also possible to prevent the possibility of reduction of the metal catalyst (B) and the associated formation of colloidal metal particles, occurring in the form of a black precipitate, by adding the component (C).

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals, such as the n-hexyl radical; heptyl radicals such as the n-heptyl radical; octyl radicals, such as the n-octyl radical isooctyl radicals and the 2,2,4-tri-methylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as o-, m-, p-tolyl radicals, xylyl radicals, and ethylphenyl radicals; and aralkyl radicals such as the benzyl radical, and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, and the heptafluoroisopropyl radical, and haloaryl radicals, such as the o-, m- and p-chlorophenyl radicals.

Radical R preferably comprises monovalent hydrocarbon radicals optionally substituted by halogen atoms and having 1 to 6 carbon atoms, more preferably alkyl radicals having 1 or 2 carbon atoms, and most preferably the methyl radical.

Examples of radicals R¹ are hydrogen and also the radicals specified for R. Radical R¹ preferably comprises hydrogen or hydrocarbon radicals having 1 to 20 carbon atoms, most preferably hydrogen.

Examples of radical R² are hydrogen and also the examples specified for radical R. Radical R² preferably comprises hydrogen or alkyl radicals optionally substituted by halogen atoms and having 1 to 10 carbon atoms, more preferably alkyl radicals having 1 to 4 carbon atoms, most preferably the methyl or ethyl radical.

Examples of radical R³ are hydrogen, the radicals specified for R, or a group —CH(COOR⁴)—CH₂—COOR⁴.

Radical R³ preferably comprises hydrogen, a group —CH(COOR⁴)—CH₂—COOR⁴, or an optionally substituted hydrocarbon radical having 1 to 20 carbon atoms, more preferably a linear, branched or cyclic alkyl group having 1 to 20 carbon atoms, or an aryl group optionally substituted by halogen atoms and having 6 to 20 carbon atoms. Where radical X is a —O—C(=O)— group, radical $R^3$ is more preferably a hydrogen atom.

Examples of radical $R^4$ are the radicals specified for R.

The radicals $R^4$ are preferably alkyl groups having 1 to 10 carbon atoms, more preferably methyl, ethyl or propyl radicals.

The radicals Y preferably have number-average molar masses $M_n$ of at least 200 g/mol, more preferably at least 500 g/mol, most preferably at least 1000 g/mol. The radicals Y preferably have number-average molar masses $M_n$ of at most 40,000 g/mol, more preferably at most 25,000 g/mol, and most preferably of at most 20,000 g/mol.

This number-average molar mass $M_n$ for the purposes of the present invention is determined by size exclusion chromatography (SEC) against polystyrene standard, in THF, at 60° C., flow rate 1.2 ml/min and detection by RI (refractive index detector) on a Styragel HR3-HR4-HR5-HR5 column set from Waters Corp. USA with an injection volume of 100 μl.

Examples of polymer radical Y are organic polymer radicals whose number-average molecular mass is 200 to 40,000 g/mol and which comprise as their polymer chain polyoxyalkylenes such as polyoxyethylene, polyoxypropylene, polyoxybutylene, polyoxytet-ramethylene, polyoxyethylene-polyoxypropylene copolymer, and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymers or polycarbonates.

The polymer radical Y preferably comprises polyester, polyether, polyurethane, polyalkylene or polyacrylate radicals, more preferably polyurethane radicals, polyester radicals or polyoxyalkylene radicals, most preferably polyoxypropylene radicals, with the proviso that their number-average molecular mass is 200 to 40,000 g/mol.

The component (A) here may have the silane groups of the formula

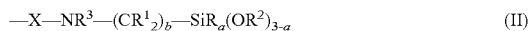
$$—X—NR^3—(CR^1{}_2)_b—SiR_a(OR^2)_{3-a} \quad (II)$$

at any desired locations in the polymer, such as, for instance, pendently and/or terminally, with the radicals and indices having the definition stated above.

The silane groups of the formula (II) are preferably groups of the formulae

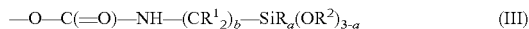
$$—O—C(=O)—NH—(CR^1{}_2)_b—SiR_a(OR^2)_{3-a} \quad (III)$$

or

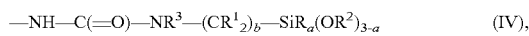
$$—NH—C(=O)—NR^3—(CR^1{}_2)_b—SiR_a(OR^2)_{3-a} \quad (IV),$$

with the radicals and indices having the definitions stated above.

With particular preference, the radical Y in formula (I) comprises polyester radicals, polyurethane radicals or polyoxyalkylene radicals whose number-average molecular mass is 200 to 40,000 g/mol, with groups of the formula (III) or (IV) attached terminally to them.

More particularly, the radical Y in formula (I) comprises polyester radicals, polyurethane radicals or polyoxyalkylene radicals, whose polymer chain has not more than one branching point and whose number-average molecular mass is 200 to 40,000 g/mol, with 1 to 3 groups of the formula (III) or (IV) attached terminally to them.

Very preferably, the radical Y in formula (I) comprises linear polyester radicals, linear polyurethane radicals or linear polyoxyalkylene radicals whose number-average molecular mass is 200 to 40,000 g/mol, with 1 to 2 groups of the formula (III) or (IV) attached terminally to them.

The polyurethane radicals Y are preferably radicals with silane groups of the formula (III) or (IV) bonded to their chain ends. These polyurethane radicals Y are preferably preparable from linear or branched polyoxyalkylenes, more particularly from polypropylene glycols, and di- or polyisocyanates.

The polyester radicals Y are preferably polymeric reaction products of monomeric dicarboxylic acids and monomeric diols or of hydroxycarboxylic acids or else of cyclic lactones such as ε-caprolactone, for example, with silane groups of the formula (III) bonded to their chain ends.

The polyoxyalkylene radicals Y are preferably linear or branched polyoxyalkylene radicals, more preferably polyoxypropylene radicals, with groups of the formula (III) bonded to their chain ends. Here, preferably, at least 85%, more preferably at least 90%, more particularly at least 95% of all the chain ends are bonded to groups of the formula (III).

The hydroxy-functional organic compounds used in the process of the invention are preferably polyols (×1) of the formula

$$Y—[OH]_x \quad (V),$$

where

Y is an x-valent polymer radical and x is an integer from 1 to 10, preferably 1, 2 or 3, more preferably 1 or 2.

The polyols (A1) are preferably polyurethane containing hydroxyl groups, polyester containing hydroxyl groups or polyoxyalkylene containing hydroxyl groups, more particularly polyoxypropylene containing hydroxyl groups, with the proviso that their number-average molecular mass is 200 to 40,000 g/mol, preferably 1000 to 25,000 g/mol, more preferably 2000 to 20,000 g/mol.

The polyols (A1) used in accordance with the invention may be branched or unbranched; preferably they are unbranched.

The polyols (A1) are standard commercial products and/or are preparable by methods common in chemistry. Examples of commercially available polyols which can be employed as component (A1) are the Acclaim® polymers from Covestro (Leverkusen, D E), such as, for example, Acclaim® 4200, Acclaim® 8200, Acclaim® 12200 or Acclaim® 18200.

The isocyanate-functional compounds used in accordance with the invention are preferably compounds selected from isocyanato-functional silanes (A2) of the formula

$$OCN—(CR^1{}_2)_b—SiR_a(OR^2)_{3-a} \quad (VI),$$

where

R may be identical or different and is a monovalent, optionally substituted, SiC-bonded hydrocarbon radical, $R^1$ may be identical or different and is hydrogen or a monovalent, optionally substituted hydrocarbon radical which may be attached via nitrogen, phosphorus, oxygen, sulfur, or carbonyl group to the carbon atom, $R^2$ may be identical or different and is hydrogen or a monovalent, optionally substituted hydrocarbon radical, a may be identical or different and is 0, 1 or 2, preferably 0 or 1, and b may be identical or different and is an integer from 1 to 10, preferably 1, 3 or 4, more preferably 1 or 3, more particularly 1, and di- and/or polyisocyanates (A3).

Examples of silanes (A2) of the formula (VI) are isocyanatomethyldimethylmethoxysilane, 3-isocyanatopropyl-dimethylmethoxysilane, isocyanatomethylmethyldimethoxysilane, 3-isocyanatopropylmethyldimethoxysilane, isocyanatomethyltrimethoxysilane, and 3-isocyanatopropyltrimethoxysilane, with isocyanatomethylmethyldimethoxysilane, 3-isocyanatopropylmethyldimethoxysilane, isocyanatomethyltrimethoxysilane, and 3-isocyanatopropyltrimethoxysilane being preferred and isocyanatomethylmethyldimethoxysilane and 3-isocyanatopropylmethyldimethoxysilane being particularly preferred.

The silanes of the formula (VI) used in accordance with the invention are standard commercial products and/or may be prepared by processes of the kind described for example in EP 1937697 or EP2097426.

Examples of diisocyanates (A3) used in accordance with the invention are diisocyanatodiphenylmethane (MDI), both in the form of crude or technical MDI and in the form of pure 4,4' and/or 2,4' isomers or mixtures thereof, tolylene diisocyanate (TDI) in the form of its various regioisomers, particularly the 2,4- and the 2,6-TDI and also mixtures of these regioisomers, diisocyanatonaphthalene (NDI), isophorone diisocyanate (IPDI), or else of hexamethylene diisocyanate (HDI).

Examples of polyisocyanates (A3) used in accordance with the invention are polymeric MDI (P-MDI), triphenylmethane triisocyanate or else trimers (biurets or isocyanurates) of the aforementioned diisocyanates. Mixtures of different di- and/or polyisocyanates may also be used.

Component (A3) preferably comprises the abovementioned types and derivatives of diisocyanatodiphenylmethane (MDI) and of tolylene diisocyanate (TDI), isophorone diisocyanate (IPDI), or else of hexamethylene diisocyanate (HDI).

Component (A3) as well comprises standard commercial products.

The organyloxy-functional silanes used optionally in the process of the invention are preferably organyloxy-functional silanes (A4) containing amino groups, more preferably silanes of the formula

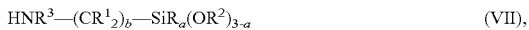

$$HNR^3—(CR^1{}_2)_b—SiR_a(OR^2)_{3-a} \quad (VII),$$

where

R may be identical or different and is a monovalent, optionally substituted, SiC-bonded hydrocarbon radical, $R^1$ may be identical or different and is hydrogen or a monovalent, optionally substituted hydrocarbon radical which may be attached via nitrogen, phosphorus, oxygen, sulfur, or carbonyl group to the carbon atom, $R^2$ may be identical or different and is hydrogen or a monovalent, optionally substituted hydrocarbon radical, $R^3$ may be identical or different and is hydrogen atom, a monovalent, optionally substituted hydrocarbon radical or a group —CH(COOR$^4$)—CH$_2$—COOR$^4$, a may be identical or different and is 0, 1 or 2, preferably 0 or 1, and b may be identical or different and is an integer from 1 to 10, preferably 1, 3 or 4, more preferably 1 or 3, more particularly 1.

Examples of component (A4) of the formula (VII) are HN[CH(COOR$^4$)—CH$_2$—COOR$^4$](CH$_2$)$_3$—Si(OCH$_3$)$_3$, HN[CH(COOR$^4$)—CH$_2$—COOR$^4$](CH$_2$)$_3$—Si(OCH$_3$)$_2$CH$_3$, where R$^4$ has one of the definitions stated above, HN[(CH$_2$)$_3$—Si(OCH$_3$)$_3$]$_2$, HN[(CH$_2$)$_3$—Si(OC$_2$H$_5$)$_3$]$_2$, HN[(CH$_2$)$_3$—Si(OCH$_3$)$_2$CH$_3$]$_2$, HN[(CH$_2$)$_3$—Si(OC$_2$H$_5$)$_2$CH$_3$]$_2$, HN[(CH$_2$)—Si(OCH$_3$)$_3$]$_2$, HN[(CH$_2$)—Si(OC$_2$H$_5$)$_3$]$_2$, HN[(CH$_2$)—Si(OCH$_3$)$_2$CH$_3$]$_2$, HN[(CH$_2$)—Si(OC$_2$H$_5$)$_2$CH$_3$]$_2$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)—Si(OCH$_3$)$_3$, cyclo-C$_6$H$_{11}$NH(CH$_2$)—Si(OC$_2$H$_5$)$_3$, cyclo-C$_6$H$_{11}$NH(CH$_2$)—Si(OCH$_3$)$_2$CH$_3$, cyclo-C$_6$H$_{11}$NH(CH$_2$)—Si(OC$_2$H$_5$)$_2$CH$_3$, phenyl-NH(CH$_2$)$_3$—Si(OCH$_3$)$_3$, phenyl-NH(CH$_2$)$_3$—Si(OC$_2$H$_5$)$_3$, phenyl-NH(CH$_2$)$_3$—Si(OCH$_3$)$_2$CH$_3$, phenyl-NH(CH$_2$)$_3$—Si(OC$_2$H$_5$)$_2$CH$_3$, phenyl-NH(CH$_2$)—Si(OCH$_3$)$_3$, phenyl-NH(CH$_2$)—Si(OC$_2$H$_5$)$_3$, phenyl-NH(CH$_2$)—Si(OCH$_3$)$_2$CH$_3$, phenyl-NH(CH$_2$)—Si(OC$_2$H$_5$)$_2$CH$_3$, alkyl-NH(CH$_2$)$_3$—Si(OCH$_3$)$_3$, alkyl-NH(CH$_2$)$_3$—Si(OC$_2$H$_5$)$_3$, alkyl-NH(CH$_2$)$_3$—Si(OCH$_3$)$_2$CH$_3$, alkyl-NH(CH$_2$)$_3$—Si(OC$_2$H$_5$)$_2$CH$_3$, alkyl-NH(CH$_2$)—Si(OCH$_3$)$_3$, alkyl-NH(CH$_2$)—Si(OC$_2$H$_5$)$_3$, alkyl-NH(CH$_2$)—Si(OCH$_3$)$_2$CH$_3$ and alkyl-NH(CH$_2$)—Si(OC$_2$H$_5$)$_2$CH$_3$, and also their partial hydrolysates, preferably cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)—Si(OCH$_3$)$_3$, cyclo-C$_6$H$_{11}$NH(CH$_2$)—Si(OC$_2$H$_5$)$_3$, cyclo-C$_6$H$_{11}$NH(CH$_2$)—Si(OCH$_3$)$_2$CH$_3$, cyclo-C$_6$H$_{11}$NH(CH$_2$)—Si(OC$_2$H$_5$)$_2$CH$_3$, phenyl-NH(CH$_2$)$_3$—Si(OCH$_3$)$_3$, phenyl-NH(CH$_2$)$_3$—Si(OC$_2$H$_5$)$_3$, phenyl-NH(CH$_2$)$_3$—Si(OCH$_3$)$_2$CH$_3$, phenyl-NH(CH$_2$)$_3$—Si(OC$_2$H$_5$)$_2$CH$_3$, phenyl-NH(CH$_2$)—Si(OCH$_3$)$_3$, phenyl-NH(CH$_2$)—Si(OC$_2$H$_5$)$_3$, phenyl-NH(CH$_2$)—Si(OCH$_3$)$_2$CH$_3$, phenyl-NH(CH$_2$)—Si(OC$_2$H$_5$)$_2$CH$_3$ and also alkyl-NH(CH$_2$)$_3$—Si(OCH$_3$)$_3$, alkyl-NH(CH$_2$)$_3$—Si(OC$_2$H$_5$)$_3$, alkyl-NH(CH$_2$)$_3$—Si(OCH$_3$)$_2$CH$_3$, alkyl-NH(CH$_2$)$_3$—Si(OC$_2$H$_5$)$_2$CH$_3$, alkyl-NH(CH$_2$)—Si(OCH$_3$)$_3$, alkyl-NH(CH$_2$)—Si(OC$_2$H$_5$)$_3$, alkyl-NH(CH$_2$)—Si(OCH$_3$)$_2$CH$_3$ or alkyl-NH(CH$_2$)—Si(OC$_2$H$_5$)$_2$CH$_3$, where "alkyl" is preferably ethyl, n-propyl, isopropyl, n-butyl, isobutyl, t-butyl or the various stereoisomers of the pentyl, hexyl, heptyl or octyl radical, more preferably HN[CH(COOR$^4$)—CH$_2$—COOR$^4$](CH$_2$)$_3$—Si(OCH$_3$)$_3$ or HN[CH(COOR$^4$)—CH$_2$—COOR$^4$](CH$_2$)$_3$—Si(OCH$_3$)$_2$CH$_3$, with R$^4$ having one of the definitions stated above.

The silanes (A4) are standard commercial products and/or preparable by methods common in chemistry.

Silanes (A4) are used preferably when the isocyanate-functional compounds are di- and/or polyisocyanates (A3).

In addition to the components (A1), (A2), (A3), (B) and (C) and also, optionally, (A4), additional components may be used in the process of the invention, such as, for example, isocyanate-reactive compounds (A5) which are different from component (A1) and (A4), and also compounds having an isocyanate group (A6).

Examples of optionally employed component (A5) are compounds having one or more NH, OH or SH functions, which are likewise able to react with isocyanate groups, such as, for instance, monomeric alcohols having 1 to 4 hydroxyl groups.

As optionally employed component (A5) it is possible, for example, to use monomeric alcohols having a hydroxyl group, such as methanol, ethanol or butanol, preferably alcohols having a hydroxyl group with at least 6 carbon atoms, more preferably alcohols having a hydroxyl group with at least 8 carbon atoms, more particularly with at least 10 carbon atoms.

As component (A5), furthermore, it is also possible to use monomeric alcohols having 2 to 4 hydroxyl groups, preferably 2 hydroxyl groups, such as glycol, propanediol, glycerol, and pentaerythritol, for example.

The optionally employed further components (A6) may be compounds having an isocyanate group, such as butyl isocyanate, cyclohexyl isocyanate or phenyl isocyanate, for example.

With preference neither component (A5) nor component (A6) is used in the process of the invention.

The first step of the process of the invention uses isocyanate-functional compounds in amounts such that the molar ratio of all the isocyanate groups to all the hydroxyl radicals of the polyols (A1) and also, where present, $NHR^3$ groups of the silanes (A4) is preferably 0.75 to 1.25, more preferably 1.0 to 1.2, the definition of $R^3$ being the same as that stated above.

Where, in the process of the invention, the isocyanate component (A2) or (A3), or the isocyanate components (A2) and (A3), is or are used in excess, it is preferable, after the reaction thereof with the polyol (A1) and also, optionally, with the silane (A4), to add an alcohol (L) having a hydroxyl group in a workup step, in order to bring about reaction of the excess isocyanate groups. The resulting product mixture is preferably isocyanate-free. The alcohol (L) used for this purpose may comprise the alcohols stated above for (A5) with a hydroxyl group, preferably a monool having 1 to 6 carbon atoms, more preferably methanol or ethanol. Relative to the isocyanate groups still present in the reaction mixture, the alcohol is used preferably in a ratio of 0.9:1 to 20:1, more preferably in a ratio of 1:1 to 10:1, more particularly of 1.1:1 to 5:1.

In the process of the invention preferably no further components are used beyond the components (A1), (A2), (A3), (A4), (B), (C), and alcohol (L).

The metal-containing catalyst (B) used in the process of the invention may in principle comprise any desired metal-containing compounds known to date which are capable of accelerating the formation of urethane from hydroxyl- and isocyanate-functional reactants.

The catalysts (B) used in accordance with the invention preferably comprise metal atoms (M) selected from lithium, potassium, titanium, iron, copper, indium, zinc, manganese, zirconium, tin, and bismuth atoms, preferably iron, copper, zinc, bismuth, tin or indium atoms, and more preferably tin, zinc or bismuth atoms.

In one preferred version of the invention the metal-containing catalysts (B) are carboxylates or are dicarbonyl compounds of the above-stated metal atoms (M).

The dicarbonyl compounds (B) are preferably acetylacetonate, alkyl acetoacetates, dialkyl malonates, ethyl benzoylacetate, dibenzoylmethane or benzoylacetone of the abovementioned metal atoms (M), more particularly acetylacetonate of the abovementioned metal atoms (M).

The carboxylates (B) are preferably the carboxylates of aliphatic, saturated or else unsaturated monocarboxylic acids, having 4 to 30 carbon atoms, of the abovementioned metal atoms (M).

Examples of monocarboxylic acids on which the carboxylates (B) can be based are arachidic acid, arachidonic acid, behenic acid, butyric acid, caproleic acid, capric acid, caproic acid, caprylic acid, cerotinic acid, cetoleic acid, clupanodonic acid, eleostearic acid, enanthic acid, erucic acid, gadoleic acid, gondolic acid, hiragonic acid, lauric acid, lignoceric acid, linderaic acid, linoleic acid, linolenic acid, melissic acid, montanic acid, myristic acid, myristoleic acid, naphthenic acid, neodecanoic acid, obtusilinic acid, neooctanoic acid, oleic acid, palmitic acid, palmitoleic acid, parinic acid, petroselinic acid, physetic acid, punicic acid, scoliondonic acid, selacholeic acid, stearidonic acid, stearic acid, tricosanoic acid, tzuzuinic acid, vaccenic acid or else what are called Versatic® acids, which the skilled person knows to be a group of tertiary, highly branched, saturated monocarboxylic acids, such as, for example, 2,2-dimethylpropionoic acid, 2,2-dimethylbutyric acid, 2,2-di-methylpentanoic acid, 2,2-dimethylhexanoic acid, 2,2-di-methylheptanoic acid or 2,2-dimethyloctanoic acid (neodecanoic acid).

In a further preferred version of the invention, the metallic catalyst (B) is an organylmetal compound with at least one metal-carbon compound, more particularly an organyltin compound such as the dialkyltin dicarboxylates.

Alkoxylates of the abovementioned metal atoms (M), more particularly titanium(IV) alkoxylates, may also be used as metallic catalyst (B).

Examples of the catalysts (B) used in accordance with the invention are dibutyltin oxide, dibutyltin diacetate, dibutyltin dilaurate, dibutyltin diacetylacetonate, dioctyltin dilaurate, dioctyltin diacetate, tin(II) acetate, tin(II) octanoate, tin(II) acetylacetonate, titanium(IV) isopropylate, potassium neodecanoate, indium neodecanoate, zirconium(IV) acetylacetonate, copper naphthenate, iron(III) acetylacetonate, iron naphthenate, zinc acetylacetonate, zinc 2-ethylhexanoate, zinc neodecanoate, bismuth 2-ethylhexanoate, bismuth neodecanoate, and bismuth tetramethylheptanedionate. Examples of commercially available bismuth catalysts are Borchi® Kat 22, Borchi® Kat VP 0243, Borchi® Kat VP 0244, Borchi® Kat 315 (OMG-Borchers GmbH, Langenfeld, Del.), the BICAT® products (The Shepherd Chemical Company, USA), and K-Kat® K-348 (KING INDUSTRIES, INC., USA).

Preferred examples of catalysts (B) used in accordance with the invention are dialkyltin compounds, selected from dibutyltin oxide, dibutyltin diacetate, dibutyltin dilaurate, dibutyltin diacetylacetonate, dioctyltin dilaurate, dioctyltin diacetate, iron(III) acetylacetonate, zirconium(IV) acetylacetonate or the abovementioned bismuth catalysts.

In the first process step of the invention, catalysts (B) are used in amounts of preferably 0.0005 to 0.5 part by weight, more preferably 0.001 to 0.1 part by weight, most preferably from 0.005 to 0.05 part by weight, based in each case on 100 parts by weight of the finished polymer (A).

The reaction of the reactants in the first step of the process of the invention may take place in any desired way known to date, and the components used can be brought into contact by simple mixing.

The first step of the process of the invention is preferably carried out at temperatures of 0 to 150° C., more preferably at 30 to 100° C. The first step of the process of the invention is preferably carried out at the pressure of the surrounding atmosphere, in other words about 900 to 1100 hPa.

The first process step is preferably carried out under protective gas, e.g., under nitrogen.

The first process step may be carried out either continuously or batchwise, with batch processes being described, for example, in EP-A 0931800 or EP-A 1535940, and a continuous process being described in EP-A 1896523.

In one preferred embodiment of the process of the invention (variant 1), polyols (A1) are reacted in the first step with isocyanato-functional silanes (A2) in the presence of catalyst (B). According to this variant 1, preferably no components (A3) and (A4) are used in the first step, and it is possible in particular to prepare polymers (A) having silane groups of the formula (III).

In another preferred embodiment of the process of the invention (variant 2), polyols (A1) are reacted in the first step with di- and/or polyisocyanates (A3) and also organyloxyfunctional silanes (A4) containing amino groups, in the presence of catalyst (B). According to this variant 2, preferably no components (A2) are used in the first step, and it is possible in particular to prepare polymers (A) having silane groups of the formula (IV).

The reaction according to variant 2 of the invention may take place in one operating step, in which the components (A1), (A3) and (A4) and also, optionally, components (A5), (A6) are added simultaneously or in succession in any order and reacted with one another. The reaction may alternatively take place in two or more operating steps, in which the individual components are reacted with one another successively in two or separate operating steps. Here again the sequence in which the individual components are reacted with one another is arbitrary.

The chelating agent (C) added in the second step of the process of the invention comprises a multidentate ligand which together with a metal ion forms a chelate complex.

The term "chelate complex" here represents a compound in which a multidentate ligand, i.e., a ligand possessing two or more heteroatoms each having at least one free electron pair, occupies at least two coordination sites or binding sites of a central metal atom or a central metal ion.

If the chelating agent (C) used in accordance with the invention comprises crown ethers (C1), preference is given to [12]crown-4, [15]crown-5, [18]crown-6, or [21]crown-7. In this notation, the number in square brackets denotes the total number of atoms in the ring of the crown ether, whereas the suffixed number indicates the number of oxygen atoms present in this crown; all crown ethers are made up of —$CH_2CH_2O$— groups.

If the chelating agent (C) used in accordance with the invention comprises compound (C2) containing heterocyclic system, whose ring heteroatom possesses a free electron pair and which comprises at least one further heteroatom having a free electron pair, with preferably both heteroatoms together being capable of entering into a chelate complex with a central metal ion, preference is given to compounds having at least one nitrogen-containing heterocycle, such as, for example, 2,2'-bipyridine, 8-hydroxyquinoline, phenanthroline or 1,4,7,10-tetraazacyclododecane-1,4,7,10-tetraacetic acid, and also derivatives of these compounds.

If the chelating agent (C) used in accordance with the invention comprises compounds (C3) having at least two groups per molecule that are selected from carboxyl groups, carboxylate groups, sulfate groups, sulfonate groups, phosphate groups, phosphonate groups, cyanide groups, and cyanate groups, preference is given to compounds having at least two carboxyl groups or compounds having at least two carboxylate groups.

Preferred examples of components (C3) are oxalic acid, malonic acid, succinic acid, glutaric acid, adipic acid, pimelic acid, suberic acid, azelaic acid, sebacic acid, tartronic acid, malic acid, tartaric acid, α-ketoglutaric acid, oxalacetic acid, 2,3-dimercaptosuccinic acid, maleic acid, phthalic acid, glutamic acid, aspartic acid, citric acid, trimellitic acid, iminodiacetic acid, nitrilotriacetic acid, ethylenediaminetetraacetic acid (EDTA), diethylenetriaminepentaacetic acid, triethylenetetraminehexaacetic acid, and also their carboxylates and/or partial carboxylates. Preferred among the carboxylates and/or partial carboxylates are alkali metal or alkaline earth metal carboxylates and/or partial carboxylates, with particular preference being given to sodium or potassium carboxylates and/or partial carboxylates, more particularly the sodium or potassium carboxylates.

With particular preference component (C3) comprises succinic acid, malic acid, citric acid, tartaric acid or ethylenediaminetetraacetic acid (EDTA).

Preferred for use as chelating agents (C) in accordance with the invention are compounds (C3).

In accordance with the invention the chelating agent (C) can be added in pure form or else in the form of a solution in an organic solvent. Examples of organic solvents are low molecular mass ethers, esters, ketones, aromatic and aliphatic and also optionally halogen-containing hydrocarbons, and alcohols, preference being given to alcohols, particularly methanol, ethanol, propanol, isopropanol, butanol, isobutanol, and tert-butanol.

In the second step of the process of the invention, chelating agent (C) is added preferably in an amount such as to result in a molar ratio of metal ions from component (B) to chelating agents (C) of 0.8 to 1000, more preferably 1.0 to 10.0, most preferably of 1.0 to 3.0.

In the process of the invention, the chelating agent (C) may be added at any desired time after the preparation of the polymers (A) according to the first step. The chelating agent (C) is preferably added before the addition of further components to the polymer (A) prepared, more preferably before the addition of further nitrogen-containing compounds, especially before addition of a nitrogen-containing adhesion promoter.

In the process of the invention, the addition of the chelating agent (C) according to the second step preferably takes place at temperatures of 0 to 150° C., more preferably at 10 to 100° C. The second step of the process of the invention is preferably carried out at a pressure of the surrounding atmosphere, i.e., about 900 to 1100 hPa.

The second process step as well is preferably carried out under protective gas, such as under nitrogen.

The addition of the chelating agent (C) may be made either continuously, by means of a static mixer, for example, or else batchwise.

The components used in the process of the invention may in each case be one kind of such a component or else a mixture of at least two kinds of a respective component.

The organyloxysilyl-terminated polymers (A) prepared in accordance with the invention, and the composition of the invention, may be employed wherever organyloxysilyl-terminated polymers have also been used to date. In particular they are suitable for use in crosslinkable compositions, in other words as binders for adhesives, sealants and/or coatings. By virtue of their improved color stability, they are suitable particularly for use in white and/or transparent compositions, with their use in transparent compositions being particularly significant.

Depending on the specific application and/or the particular profile of requirements, the composition of the invention may comprise further constituents in addition to components (A) and (U), these further constituents being selected from (D) nitrogen-containing organosilicon compounds, (E) silicone resins, (F) catalysts, (G) adhesion promoters, (H) water scavengers, (I) fillers, (J) additives, and (K) aggregates.

The compositions of the invention are preferably crosslinkable compositions comprising
(A) organyloxysilyl-terminated polymers,
(U) product of reaction of catalyst (B) and chelating agent (C),
optionally (D) nitrogen-containing organosilicon compounds,
optionally (E) silicone resins,
optionally (F) catalysts,
optionally (G) adhesion promoters, optionally (H) water scavengers,
optionally (I) fillers,
optionally (J) additives, and
optionally (K) aggregates.

The components (D) to (K) and also the preferred amounts in which they are used have been topics of much discussion; for example, WO-A 2015024773 on page 12, line 24 to page 23, line 21, this being included in the disclosure content of the present specification.

The compositions of the invention are more preferably crosslinkable compositions comprising
(A) organyloxysilyl-terminated polymers,
(U) product of reaction of catalyst (B) and chelating agent (C),
(D) nitrogen-containing organosilicon compounds,
optionally (E) silicone resins,
optionally (F) catalysts,
optionally (G) adhesion promoters,
optionally (H) water scavengers,
optionally (I) fillers,
optionally (J) additives, and
optionally (K) aggregates.

The compositions of the invention are especially crosslinkable compositions comprising
(A) organyloxysilyl-terminated polymers,
(U) product of reaction of catalyst (B) and chelating agent (C),
(D) nitrogen-containing organosilicon compounds,
optionally (E) silicone resins,
optionally (F) catalysts,
optionally (G) adhesion promoters,
optionally (H) water scavengers,
optionally (I) fillers,
optionally (J) additives, and
optionally (K) aggregates.

The components used in accordance with the invention may in each case be one kind of such a component or else a mixture of at least two kinds of a respective component.

The adhesives, sealants or coatings of the invention may be produced in any desired manner that is known per se, such as, for instance, by methods and mixing techniques of the kind customary for the production of moisture-curing compositions. The sequence in which the various constituents are mixed with one another here may be varied arbitrarily.

This mixing may take place at room temperature and the pressure of the surrounding atmosphere, in other words about 900 to 1100 hPa. If desired, however, this mixing may also take place at higher temperatures, such as at temperatures in the range from 30 to 130° C. It is possible, moreover, to carry out mixing temporarily or continually under reduced pressure, such as at an absolute pressure of 30 to 500 hPa, in order to remove volatile compounds and/or air. The mixing according to the invention takes place preferably in the absence of moisture.

The process of the invention has the advantage that it is quick and easy to carry out, the substrates used being readily available raw materials.

The advantage of the process of the invention lies in the fact that the polymers (A) prepared are notable for improved stability with respect to atmospheric moisture.

A further advantage of the process of the invention is that the polymers prepared can be put directly to further use, in the production of crosslinkable compositions, for example.

The compositions of the invention have the advantage that they are notable for improved storage stability and better stability with respect to thermal loads. Moreover, they exhibit high color stability and no tendency toward graying or blackening.

In the examples described below, all viscosity figures relate to a temperature of 25° C. Unless otherwise indicated, the examples below are carried out at a pressure of the surrounding atmosphere, in other words approximately at 1000 hPa, and at room temperature, in other words approximately 23° C., or at a temperature which comes about when the reactants are combined at room temperature without additional heating or cooling, and are also carried out at a relative atmospheric humidity of approximately 50%. Furthermore, all figures for parts and percentages are by weight unless otherwise specified.

Inventive Example 1

A 2 l four-neck flask with dropping funnel, Liebig condenser, KPG stirrer, and thermometer is charged with 1000 g of a polypropylene glycol having a number-average molecular mass of 12,000 g/mol (Acclaim PPG 12200, available commercially from Covestro A G, Leverkusen, D E) and this initial charge is heated to 80° C. and dried for 2 hours at a pressure of 10 mbar (reduced pressure).

The reduced pressure is broken with nitrogen, and 32.3 g of α-isocyanatomethylmethyldimethoxysilane (GENIOSIL® XL 42, available commercially from Wacker Chemie AG, Munich, Del.) are added dropwise with stirring over the course of 15 minutes. The temperature during this time remains at 80° C. Then 0.17 g of a bismuth-containing catalyst (available commercially under the name "Borchi-Kat 315" from OMG-Borchers, Langenfeld, Del.) is added. This catalyst contains 0.0272 g of bismuth in the +3 oxidation state. There is a slight warming of the reaction mixture (<5° C.). This is followed by stirring at 80° C. for 2 hours. After that time, there is still a small isocyanate peak in the IR spectrum of the reaction material, this peak corresponding to 2 to 5% of the amount of isocyanate groups originally introduced.

The mixture is cooled to 50° C. and at this temperature 1.3 g of methanol are added to destroy the remaining isocyanate. After 0.5 hour, the reaction mixture is cooled to room temperature. An IR spectrum recorded thereafter confirms the absence of isocyanate.

Subsequently, as a last step, 0.035 g of malic acid in solution in 0.070 g of methanol is added at room temperature to the polymer mixture obtained, which is then stirred at room temperature for 0.25 hour. The resulting composition is colorless and clear.

Inventive Examples 2-6

The procedure described in inventive example 1 is repeated with the modification that in the last step, in place of the malic acid, the chelating agents identified in table 1 are added. The addition is made in bulk in inventive example 2, with the solid EDTA being incorporated into the polymer mixture by intense stirring for a period of 10 minutes, and in inventive examples 3-6 the addition is made in each case for a 33 wt % strength solution in methanol.

TABLE 1

| Inventive example | Amount [g] | Chelating agent |
|---|---|---|
| 2 | 0.0380 | Ethylenediaminetetraacetic acid (EDTA) |
| 3 | 0.0250 | Citric acid |
| 4 | 0.0302 | Maleic acid |
| 5 | 0.0271 | Malonic acid |
| 6 | 0.0235 | Oxalic acid |

Comparative Example 1 (C1)

The procedure described in inventive example 1 is repeated with the modification that, without replacement, the malic acid is not added.

Example 7: Investigation of the Color Stability 95 g of each of the polymer mixtures obtained in inventive examples 1-6 and also in the comparative example $C_1$ are weighed out into a mixing beaker with 2.5 g of 3-aminopropyltrimethoxysilane (GENIOSIL® GF 96, available commercially from Wacker Chemie AG, Munich, Del.) and 2.5 g of vinyltrimethoxysilane (GENIOSIL® XL 10, available commercially from Wacker Chemie AG, Munich, Del.) and the ingredients are homogenized at 2000 rpm for 1 minute in a Speedmixer DAC 150 FV from Hauschild.

The resulting colorless and clear composition is introduced into a glass bottle, which is given an airtight seal. This bottle is subsequently stored at 70° C. for 96 hours, with a visual inspection every 24 hours. The results obtained are represented in table 2.

TABLE 2

| Sample from example | Chelating agent | Appearance after 24 h | Appearance after 48 h | Appearance after 72 h | Appearance after 96 h |
|---|---|---|---|---|---|
| 1 | Malic acid | Colorless, clear | Colorless, clear | Colorless, clear | Black, turbid |
| 2 | EDTA | Colorless, clear | Colorless, clear | Black, turbid | Black, turbid |
| 3 | Citric acid | Colorless, clear | Colorless, clear | Colorless, clear | Colorless, clear |
| 4 | Maleic acid | Colorless, clear | Yellowish, clear | Black, turbid | Black, turbid |
| 5 | Malonic acid | Colorless, clear | Grayish, slightly turbid | Black, turbid | Black, turbid |
| 6 | Oxalic acid | Colorless, clear | Black, turbid | Black, turbid | Black, turbid |
| C1 | None | Turbid, black | Black, turbid | Black, turbid | Black, turbid |

Example 8

Preparation of the Phenylsilicone Resin

A 2 l four-neck flask with dropping funnel, Liebig condenser, KPG stirrer, and thermometer is charged with 1000 g of phenyltrimethoxysilane at room temperature and, with stirring, this initial charge is now mixed with 20 g of 20% strength aqueous hydrochloric acid. It is subsequently heated to a temperature of 65-68° C., until a weak reflux begins. Then, under reflux, a mixture of 74 g of water and 40 g of methanol is added at a uniform rate over the course of 30 minutes. After the end of the addition, stirring is continued under reflux for 10 minutes, followed by cooling to room temperature.

The reaction mixture is left to stand at room temperature for approximately 16 hours, after which 60 g of sodium hydrogencarbonate are added with stirring, the mixture is stirred for 30 minutes and then the resulting solid is separated off by filtration. Finally, the low boilers (essentially methanol) are removed by distillation. In this case, initially approximately 80-90% of the distillate volume to be taken off are removed at 1013 mbar at a temperature of 120° C., and then the pressure is reduced to 10 mbar, and the remaining low-boiling residues are distilled off over the following 15-20 minutes.

A phenylsilicone resin is obtained which has an average molar mass Mn of 1200 g/mol, a viscosity of 90 mPas at 23° C., and a methoxy group content of 18 wt %, based on the total mass of the phenylsilicone resin.

Investigation of the Color Stability 35 g of each of the polymer mixtures from inventive examples 1-3 and also the comparative example C1 are weighed out into a mixing beaker with 60 g of phenylsilicone resin whose preparation is described above, 2.5 g of 3-aminopropyltrimethoxysilane (GENIOSIL® GF 96, available commercially from Wacker Chemie AG, Munich, Del.) and 2.5 g of vinyltrimethoxysilane (GENIOSIL® XL 10, available commercially from Wacker Chemie AG, Munich, Del.) and the ingredients are homogenized at 2000 rpm for 1 minute in a Speedmixer DAC 150 FV from Hauschild.

The resulting colorless and clear compositions are introduced into glass bottles, which are given airtight sealing. These bottles are subsequently stored at 70° C. for 96 hours, with a visual inspection every 24 hours. The results obtained are represented in table 3.

TABLE 3

| Sample from example | Chelating agent | Appearance after 24 h | Appearance after 48 h | Appearance after 72 h | Appearance after 96 h |
|---|---|---|---|---|---|
| 1 | Malic acid | Colorless, clear | Colorless, clear | Colorless, clear | Black, turbid |
| 2 | EDTA | Colorless, clear | Gray, slightly turbid | Black, turbid | Black, turbid |
| 3 | Citric acid | Colorless, clear | Colorless, clear | Colorless, clear | Colorless, clear |
| C1 | None | Black, turbid | Black, turbid | Black, turbid | Black, turbid |

Inventive Example 9

A 2 l four-neck flask with dropping funnel, Liebig condenser, KPG stirrer, and thermometer is charged with 1000 g of a polypropylene glycol having a number-average molecular mass of 18 000 g/mol (Acclaim PPG 18200, available commercially from Covestro AG, Leverkusen, Del.) and this initial charge is heated to 80° C. and dried for 2 hours at a pressure of 10 mbar (reduced pressure).

The reduced pressure is broken with nitrogen, and 27.4 g of γ-isocyanatopropyltrimethoxysilane (GENIOSIL® GF 40, available commercially from Wacker Chemie AG, Munich, Del.) are added dropwise with stirring over the course of 15 minutes. The temperature during this time remains at 80° C. Then 0.17 g of a bismuth- and zinc-containing catalyst (available commercially under the name "Borchi-Kat VP 244" from OMG-Borchers, Langenfeld, Del.) is added. There is a slight warming of the reaction mixture (<3° C.). This is followed by stirring at 80° C. for 2 hours. After that time, there is still a small isocyanate peak in the IR spectrum of the reaction material, this peak corresponding to 2 to 5% of the amount of isocyanate groups originally introduced.

The mixture is cooled to 50° C. and at this temperature 1.1 g of methanol are added to destroy the remaining isocyanate. After 0.5 hour, the reaction mixture is cooled to room temperature. An IR spectrum recorded thereafter confirms the absence of isocyanate.

Subsequently, as a last step, 0.035 g of malic acid in solution in 0.070 g of methanol is added at room temperature to the polymer mixture obtained, which is then stirred at room temperature for 0.25 hour. The resulting composition is colorless and clear.

Inventive Examples 10-13

The procedure described in inventive example 9 is repeated with the modification that in place of the malic acid, the chelating agents identified in table 4 are added. The addition is made in bulk in inventive example 10, with the solid EDTA being incorporated into the polymer mixture by intense stirring for a period of 10 minutes, and in inventive examples 11-13 the addition is made in each case for a 33 wt % strength solution in methanol.

TABLE 4

| Inventive example | Amount [g] | Chelating agent |
|---|---|---|
| 10 | 0.040 | Ethylenediaminetetraacetic acid (EDTA) |
| 11 | 0.030 | Citric acid |
| 12 | 0.030 | Succinic acid |
| 13 | 0.040 | Tartaric acid |

Comparative Example C2

The procedure described in inventive example 9 is repeated, with the modification that no malic acid is used.

Example 14: Investigation of the Color Stability

The procedure described in inventive example 7 is repeated, with the modification that the polymer mixtures from inventive examples 9-13 and the comparative example C2 are used. The investigation of the respective color stabilities yields the results set out in table 5.

TABLE 5

| Sample from example | Chelating agent | Appearance after 24 h | Appearance after 48 h | Appearance after 72 h | Appearance after 96 h |
|---|---|---|---|---|---|
| 9 | Malic acid | Colorless, clear | Colorless, clear | Colorless, clear | Black, turbid |
| 10 | EDTA | Colorless, clear | Grayish, slightly turbid | Black, turbid | Black, turbid |
| 11 | Citric acid | Colorless, clear | Colorless, clear | Colorless, clear | Colorless, clear |
| 12 | Succinic acid | Colorless, clear | Black, turbid | Black, turbid | Black, turbid |
| 13 | Tartaric acid | Colorless, clear | Black, turbid | Black, turbid | Black, turbid |
| C2 | None | Black, turbid | Black, turbid | Black, turbid | Black, turbid |

Inventive Example 15

The procedure described in inventive example 9 is repeated, with the modification that in the reaction of the polypropylene glycol with the isocyanatosilane, no bismuth- and zinc-containing catalyst is used. Instead, 0.20 g of iron trisacetylacetonate (available commercially from Sigma-Aldrich, Taufkirchen, Del.) is added. This catalyst contains 0.0316 g of iron in the +3 oxidation state.

Subsequently, as the last step, 0.035 g of malic acid in solution in 0.070 g of methanol is added to the resulting polymer mixture at room temperature and the mixture is stirred at room temperature for 0.25 hour. The composition thus obtained is clear and slightly orange-colored.

Inventive Example 16

The procedure described in inventive example 15 is repeated, with the modification that in the last step no malic acid is added. Instead, 0.03 g of citric acid in solution in 0.070 g of methanol is added. A clear, slightly orange-colored composition is obtained.

Comparative Example C3

The procedure described in inventive example 15 is repeated, with the modification that, without replacement, the methanolic solution of malic acid is not added. Here again, a clear, slightly orange-colored composition is obtained.

Inventive Example 17

The procedure described in inventive example 9 is repeated, with the modification that in the reaction of the polypropylene glycol with the isocyanatosilane, no bismuth- and zinc-containing catalyst is used. Instead, 0.20 g of dibutyltin dilaurate (available commercially from Sigma-Aldrich, Taufkirchen, Del.) is added. This catalyst contains 0.0375 g of tin in the +4 oxidation state.

Subsequently, as the last step, 0.035 g of malic acid in solution in 0.070 g of methanol is added to the resulting polymer mixture at room temperature and the mixture is stirred at room temperature for 0.25 hour. The composition thus obtained is colorless and clear.

Inventive Example 18

The procedure described in inventive example 17 is repeated, with the modification that in the last step no malic acid is added. Instead, 0.03 g of citric acid in solution in 0.070 g of methanol is added. A clear, colorless composition is obtained.

Comparative Example C4

The procedure described in inventive example 17 is repeated, with the modification that, without replacement, the methanolic solution of malic acid is not added. Here again, a clear, colorless composition is obtained.

Example 19: Investigation of the Storage Stability with Air Contact

For the investigation of the storage stability with air contact, the polymers from inventive examples 15-18 and also comparative examples C2, C3, and C4, in each case without the addition of further substances, are placed onto a watch glass, and the skin-forming time is ascertained.

To ascertain the skin-forming time, a dry laboratory spatula is placed carefully on the polymer surface and drawn upward during the curing under standard climatic conditions, i.e., at 23° C. and a relative humidity of approximately 50%, at regular intervals. If material remains sticking to the spatula, a skin has not yet formed. If sample no longer sticks to the spatula, then a skin has formed and the time is recorded. The results obtained in this investigation are set out in table 6.

TABLE 6

| Sample from example | Catalyst | Chelating agent | Skin-forming time |
|---|---|---|---|
| 9 | Borchi-Kat VP 244 | Malic acid | >7 days |
| 10 | Borchi-Kat VP 244 | EDTA | >7 days |
| 11 | Borchi-Kat VP 244 | Citric acid | >7 days |
| C2 | Borchi-Kat VP 244 | None | 4 days |
| 15 | Iron trisacetylacetonate | Malic acid | >7 days |
| 16 | Iron trisacetylacetonate | Citric acid | >7 days |
| C3 | Iron trisacetylacetonate | None | 36 hours |
| 17 | Dibutyltin dilaurate | Malic acid | >7 days |
| 18 | Dibutyltin dilaurate | Citric acid | 5 days |
| C4 | Dibutyltin dilaurate | None | 12 hours |

Inventive Example 20

A 2000 ml reaction vessel with stirring, cooling, and heating facilities is charged with 630 g (0.15 mol) of a polypropylene glycol having an average molar mass $M_n$ of 4200 g/mol (available commercially under the name Acclaim® 4200 from Covestro AG, Leverkusen, Del.) and this initial charge is dried with stirring for 2 hours at 80° C. and 1 mbar. It is then cooled to room temperature and subsequently 112.5 g (0.45 mol) of a liquid mixture of 2,4'- and 4,4'-MDI (available commercially under the name Desmodur® 2460M from Covestro AG, Leverkusen, Del.) are added. Immediately thereafter, 0.13 g of a bismuth-containing catalyst (available commercially under the name "Borchi-Kat 315" from OMG-Borchers, Langenfeld, Del.) is added, whereupon a slightly exothermic reaction ensues, which leads to a warming of the reaction mixture by approximately 13° C. The catalyst contains 0.0208 g of bismuth in the +3 oxidation state. The reaction mixture is stirred for a further 60 minutes without external heating, and during this time it cools down to room temperature again. Subsequently 156.8 g (0.6 mol) of 3-(N-cyclohexyl)aminopropyltrimethoxysilane (available commercially under the name GENIOSIL® GF 92 from Wacker Chemie AG, Munich, Del.) are added. Lastly, the mixture is heated to 80° C. and stirred at this temperature for 1 hour. In the resulting polymer mixture, isocyanate groups are no longer detectable by IR spectroscopy.

Subsequently, as a last step, 0.019 g of citric acid in solution in 0.05 g of methanol is added at room temperature and the composition is stirred at room temperature for 0.25 hour. A clear, colorless composition is obtained.

Comparative Example C5

The procedure described in inventive example 20 is repeated, with the modification that, without replacement, no citric acid is added.

Example 21: Investigation of the Color Stability

The procedure is as in example 7, but using the polymer mixtures from inventive example 20 and from comparative example C5. In the investigation of the respective color stabilities, the results obtained are those set out in table 7.

TABLE 7

| Sample from example | Chelating agent | Appearance after 24 h | Appearance after 48 h | Appearance after 72 h | Appearance after 96 h |
|---|---|---|---|---|---|
| 20 | Citric acid | Colorless, clear | Colorless, clear | Colorless, clear | Colorless, clear |
| C5 | None | Black, turbid | Colorless, clear | Colorless, clear | Colorless, clear |

The invention claimed is:

1. A process for preparing organyloxysilyl-terminated polymers (A), comprising:
   in a first step
   reacting at least one hydroxy-functional organic compound with at least one isocyanate-functional compound and also, optionally, with a silane containing organyloxy groups, in the presence of at least one metal-containing catalyst (B), and
   in a second step
   admixing the resulting reaction mixture from the first step with at least one chelating agent (C), which is selected from the group consisting of
   (C1) crown ethers,
   (C2) heterocycle-containing compounds whose heteroatom located in the cyclic moiety possesses a free electron pair, and which comprises at least one further heteroatom having a free electron pair, and
   (C3) compounds containing at least two groups per molecule that are selected from the group consisting of carboxyl groups, alkali metal carboxylates, alkaline earth metal carboxylates and partial alkali metal and alkaline earth metal carboxylates, sulfate groups, sulfonate groups, phosphate groups, phosphonate groups, cyanide groups, and cyanate groups.

2. The process of claim 1, wherein the hydroxy-functional organic compounds comprise polyols (A1) of the formula $$Y-[OH]_x \qquad (V)$$

where
Y is an x-valent polymer radical and
x is an integer from 1 to 10.

3. The process of claim 1, wherein the isocyanate-functional compounds comprise isocyanato-functional silanes (A2) of the formula $$OCN-(CR^1{}_2)_b-SiR_a(OR^2)_{3-a} \qquad (VI),$$

where
R are each identical or different and are monovalent, optionally halogen substituted, SiC-bonded hydrocarbon radicals,
$R^1$ are each identical or different and are hydrogen or a monovalent, optionally halogen substituted hydrocarbon radical optionally bonded via nitrogen, phosphorus, oxygen, sulfur, or a carbonyl group to the carbon atom,
$R^2$ are each identical or different and are hydrogen or a monovalent, optionally halogen substituted hydrocarbon radical,
a are each identical or different and are 0, 1 or 2, and
b are each identical or different and are integers from 1 to 10, and/or
di- and/or polyisocyanates (A3).

4. The process of claim 1, wherein the organyloxy-functional silanes comprise organyloxy-functional silanes (A4) containing amino groups.

5. The process of claim 1, wherein the chelating agent (C) comprises at least one compound (C3).

6. A process for preparing organyloxysilyl-terminated polymers (A), comprising:
in a first step
reacting at least one hydroxy-functional organic compound with at least one isocyanate-functional compound and also, optionally, with a silane containing organyloxy groups, in the presence of at least one metal-containing catalyst (B), and
in a second step
admixing the resulting reaction mixture from the first step with at least one chelating agent (C), which is selected from the group consisting of
(C1) crown ethers,
(C2) heterocycle-containing compounds whose heteroatom located in the cyclic moiety possesses a free electron pair, and which comprises at least one further heteroatom having a free electron pair, and
(C3) compounds containing at least two groups per molecule that are selected from carboxyl groups, carboxylate groups, sulfate groups, sulfonate groups, phosphate groups, phosphonate groups, cyanide groups, and cyanate groups,
wherein chelating agent (C) is added in an amount so as to result in a molar ratio of metal ions from component (B) to chelating agents (C) of 0.8 to 1000.

7. The process of claim 1, wherein in the first step, polyols (A1) are reacted with isocyanato-functional silanes (A2) in the presence of catalyst (B).

8. A process for preparing organyloxysilyl-terminated polymers (A), comprising:
in a first step
reacting at least one hydroxy-functional organic compound with at least one isocyanate-functional compound and also, optionally, with a silane containing organyloxy groups, in the presence of at least one metal-containing catalyst (B), and
in a second step
admixing the resulting reaction mixture from the first step with at least one chelating agent (C), which is selected from the group consisting of
(C1) crown ethers,
(C2) heterocycle-containing compounds whose heteroatom located in the cyclic moiety possesses a free electron pair, and which comprises at least one further heteroatom having a free electron pair, and
(C3) compounds containing at least two groups per molecule that are selected from carboxyl groups, carboxylate groups, sulfate groups, sulfonate groups, phosphate groups, phosphonate groups, cyanide groups, and cyanate groups, wherein in the first step, polyols (A1) are reacted with di- and/or polyisocyanates (A3) and also organyloxy-functional silanes (A4) containing amino groups in the presence of catalyst (B).

9. A composition comprising:
(A) organyloxysilyl-terminated polymers, prepared by reaction of at least one hydroxy-functional organic compound with at least one isocyanate-functional compound and also, optionally, a silane containing organyloxy groups, in the presence of at least one metal-containing catalyst (B), and
(U) at least one product of reaction of catalyst (B) and chelating agent (C), wherein the polymers (A) comprise those of the formula $$Y-[X-NR^3-(CR^1{}_2)_b-SiR_a(OR^2)_{3-a}]_x \qquad (I)$$

where
Y is an x-valent polymer radical,
R are each identical or different and are monovalent, optionally halogen substituted, SiC-bonded hydrocarbon radical,
$R^1$ are each identical or different and are hydrogen or monovalent, optionally halogen substituted hydrocarbon radicals which are optionally bonded via nitrogen, phosphorus, oxygen, sulfur, or a carbonyl group to the carbon atom,
$R^2$ are each identical or different and are hydrogen or a monovalent, optionally halogen substituted hydrocarbon radical,
$R^3$ are each identical or different and are hydrogen, a monovalent, optionally halogen substituted hydrocarbon radical, or a group —CH(COOR$^4$)—CH$_2$—COOR$^4$,
$R^4$ are each identical or different and are monovalent, optionally halogen substituted hydrocarbon radicals,
X is a —NH—C(=O)— or —O—C(=O)— group,
x is an integer from 1 to 10,
a are each identical or different and is 0, 1 or 2, and
b are each identical or different and is an integer from 1 to 10.

10. The process of claim 1, wherein at least one compound C3 is present, selected from the group consisting of oxalic acid, malonic acid, succinic acid, glutaric acid, adipic acid, pimelic acid, suberic acid, azelaic acid, sebacic acid, tartronic acid, malic acid, tartaric acid, α-ketoglutaric acid, oxalacetic acid, 2,3-dimercaptosuccinic acid, maleic acid, phthalic acid, glutamic acid, aspartic acid, citric acid, trimellitic acid, iminodiacetic acid, nitrilotriacetic acid, ethylenediaminetetraacetic acid (EDTA), diethylenetriaminepentaacetic acid, triethylenetetraminehexaacetic acid, and their alkali metal and alkaline earth metal carboxylates and partial carboxylates.

* * * * *